US012777064B2

(12) United States Patent
Singh et al.

(10) Patent No.: US 12,777,064 B2
(45) Date of Patent: Oct. 27, 2026

(54) ARTIFICIAL-INTELLIGENCE-BASED PROACTIVE CYBERSECURITY FOR INTEGRATION PROCESSES

(71) Applicant: Boomi, LP, Conshohocken, PA (US)

(72) Inventors: Manpreet Singh, Fremont, CA (US); Tyeshia Pegram Fornville, Fort Walton Beach, FL (US); Michael Bachman, Bala Cynwyd, PA (US)

(73) Assignee: BOOMI, LP, Conshohocken, PA (US)

( * ) Notice: Subject to any disclaimer, the term of this patent is extended or adjusted under 35 U.S.C. 154(b) by 93 days.

(21) Appl. No.: 19/013,521

(22) Filed: Jan. 8, 2025

(65) Prior Publication Data

US 2026/0197340 A1 Jul. 9, 2026

(51) Int. Cl.
*H04L 9/40* (2022.01)

(52) U.S. Cl.
CPC ................................ *H04L 63/1433* (2013.01)

(58) Field of Classification Search
CPC ................................................... H04L 63/1433
See application file for complete search history.

(56) References Cited

U.S. PATENT DOCUMENTS 12,641,094 B2 * 5/2026 Humphrey .......... H04L 63/1416
2022/0130380 A1 * 4/2022 Touati ....................... G06F 8/30
2023/0259450 A1 * 8/2023 Bussa ................. G06F 11/3684 714/26
2025/0259069 A1 * 8/2025 Litan ...................... G06N 20/00
2025/0272652 A1 * 8/2025 Makhija ............... G06Q 10/087
2026/0037832 A1 * 2/2026 Dhore .................... G06N 3/105
2026/0099301 A1 * 4/2026 Bayala Banerjee ...... G06F 8/30

* cited by examiner

*Primary Examiner* — Techane Gergiso
(74) *Attorney, Agent, or Firm* — Procopio, Cory, Haargreaves & Savitch LLP

(57) ABSTRACT

"Prevention is better than cure" aptly applies to the field of cybersecurity. However, state-of-the-art integration systems generally perform late-stage scanning that is reactive, rather than proactive. This can be particularly dangerous in a low-code environment, in which the integration processes may be constructed by novice users without expertise in mitigating cybersecurity threats. Accordingly, embodiments utilize artificial intelligence to proactively detect and resolve cybersecurity threats during the design stage of integration processes. For example, a generative model may be used with crowd-sourced integration configurations to generate synthetic integration data that are targeted towards specific cybersecurity threat endpoints. This synthetic integration data may be input to an integration process, during integration testing within a test environment, to detect and resolve cybersecurity threats, prior to deployment of the integration process to a production environment.

17 Claims, 7 Drawing Sheets

ARTIFICIAL-INTELLIGENCE-BASED PROACTIVE CYBERSECURITY FOR INTEGRATION PROCESSES

BACKGROUND

Field of the Invention

The embodiments described herein are generally directed to cybersecurity, and, more particularly, to artificial-intelligence-based proactive cybersecurity for integration processes.

Description of the Related Art

Integration Platform as a Service (iPaaS) enables the integration of applications and data on demand. The iPaaS platform provided by Boomi® of Conshohocken, Pennsylvania, enables users to construct integration processes from pre-built steps, visually represented as "shapes," which each has a set of configuration properties, on an intuitive drag-and-drop virtual canvas within a graphical user interface. Each step dictates how an integration process retrieves data, manipulates data, routes data, sends data, and/or the like. These steps can be connected together in endless combinations to build simple to very complex integration processes.

Advantageously, Boomi's intuitive graphical user interface enables even novice users to construct complex integration processes. However, such users may not be familiar with and/or account for cybersecurity threats. Even expert users may not be able to account for all cybersecurity threats. Thus, the integration processes that are constructed, via the intuitive graphical user interface, whether by novice or expert users, may suffer from cybersecurity vulnerabilities, which may expose an organization's sensitive data to malicious actors.

State-of-the-art systems perform late-stage scanning for cybersecurity threats (i.e., after the integration process has been designed or deployed). However, "prevention is better than cure" aptly applies to the field of cybersecurity. The earlier that cybersecurity threats are detected, the better.

SUMMARY

Accordingly, systems, methods, and non-transitory computer-readable media are disclosed for artificial-intelligence-based proactive cybersecurity for integration processes, which may be performed during the design stage.

In an embodiment, a method comprises using at least one hardware processor to: stored crowd-sourced integration configurations from a plurality of integration platforms managed on an Integration Platform as a Service (iPaaS) platform, wherein each of the crowd-sourced integration configurations is a configuration of an integration process on one of the plurality of integration platforms; retrieve a relevant set of integration configurations from the crowd-sourced integration configurations based on a set of one or more cybersecurity threat endpoints and a configuration of a specific integration process to be tested; apply a generative model to the relevant set of integration configurations, wherein the generative model outputs synthetic integration data to be input to the specific integration process; test the specific integration process by inputting the synthetic integration data to the specific integration process, while the specific integration process is executing within a test environment, to produce test results; and output the test results.

The generative model may be a generative language model. The generative language model may be a large language model.

The method may further comprise using the at least one hardware processor to receive a selection of the synthetic integration data from among the synthetic integration data and alternative integration data.

The method may further comprise, prior to testing the specific integration process, filtering the synthetic integration data according to one or more criteria. The one or more criteria may comprise a number of instances of synthetic integration data. The one or more criteria may comprise at least one of the one or more cybersecurity threat endpoints.

The test results may comprise a list of cybersecurity threats to which the specific integration process is vulnerable. The method may further comprise using the at least one hardware processor to receive feedback regarding the test results. The method may further comprise using the at least one hardware processor to update the generative model based on the received feedback.

The testing may be performed during a design phase of the specific integration process, prior to deployment of the specific integration process to a production environment. The method may further comprise using the at least one hardware processor to, when the tests results comprise one or more of a set of cybersecurity threats, block the deployment of the specific integration process to the production environment. Blocking of the deployment may be maintained until the one or more cybersecurity threats in the set of cybersecurity threats are resolved or the blocking of the deployment is overridden by a user.

Retrieving the relevant set of integration configurations may comprise retrieving, as the relevant set of integration configurations, one or more integration configurations in the crowd-sourced integration configurations that have an identical or similar configuration as the specific integration process and comprise at least one of the one or more cybersecurity threat endpoints.

The method may further comprise using the at least one hardware processor to, prior to applying the generative model, train the generative model using a generative adversarial network that comprises the generative model and a discriminator, wherein the discriminator classifies real integration data and synthetic integration data, output by the generative model, into a real class or a fake class, and wherein the generative model and discriminator are updated based on respective losses.

It should be understood that any of the features in the methods above may be implemented individually or with any subset of the other features in any combination. Thus, to the extent that the appended claims would suggest particular dependencies between features, disclosed embodiments are not limited to these particular dependencies. Rather, any of the features described herein may be combined with any other feature described herein, or implemented without any one or more other features described herein, in any combination of features whatsoever. In addition, any of the methods, described above and elsewhere herein, may be embodied, individually or in any combination, in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for artificial-intelligence-based proactive cybersecurity for integration processes. Disclosed embodiments may be used to identify cybersecurity threats early on in the management of an integration process, and potentially and preferably during the design stage, prior to deployment of the integration process. This can prevent cybersecurity failures during actual execution of the integration process in the operational stage. However, while it is preferable to perform the disclosed embodiments during the design stage, it should be understood that the disclosed embodiments may be performed on any integration process, including those that have already been deployed within a production environment.

In an embodiment, a generative model is used to generate synthetic integration data, to be used during testing of the integration process. The synthetic integration data are relevant to cybersecurity threat endpoints applicable to the integration process. The synthetic integration data enable the integration testing to detect potential cybersecurity threats and offer proactive solutions, during the design stage, prior to deployment of the integration process within a production environment. This is in contrast to state-of-the-art systems which are only able to perform late-stage scanning for cybersecurity threats (i.e., after the design stage).

After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. Infrastructure

Figure 1:
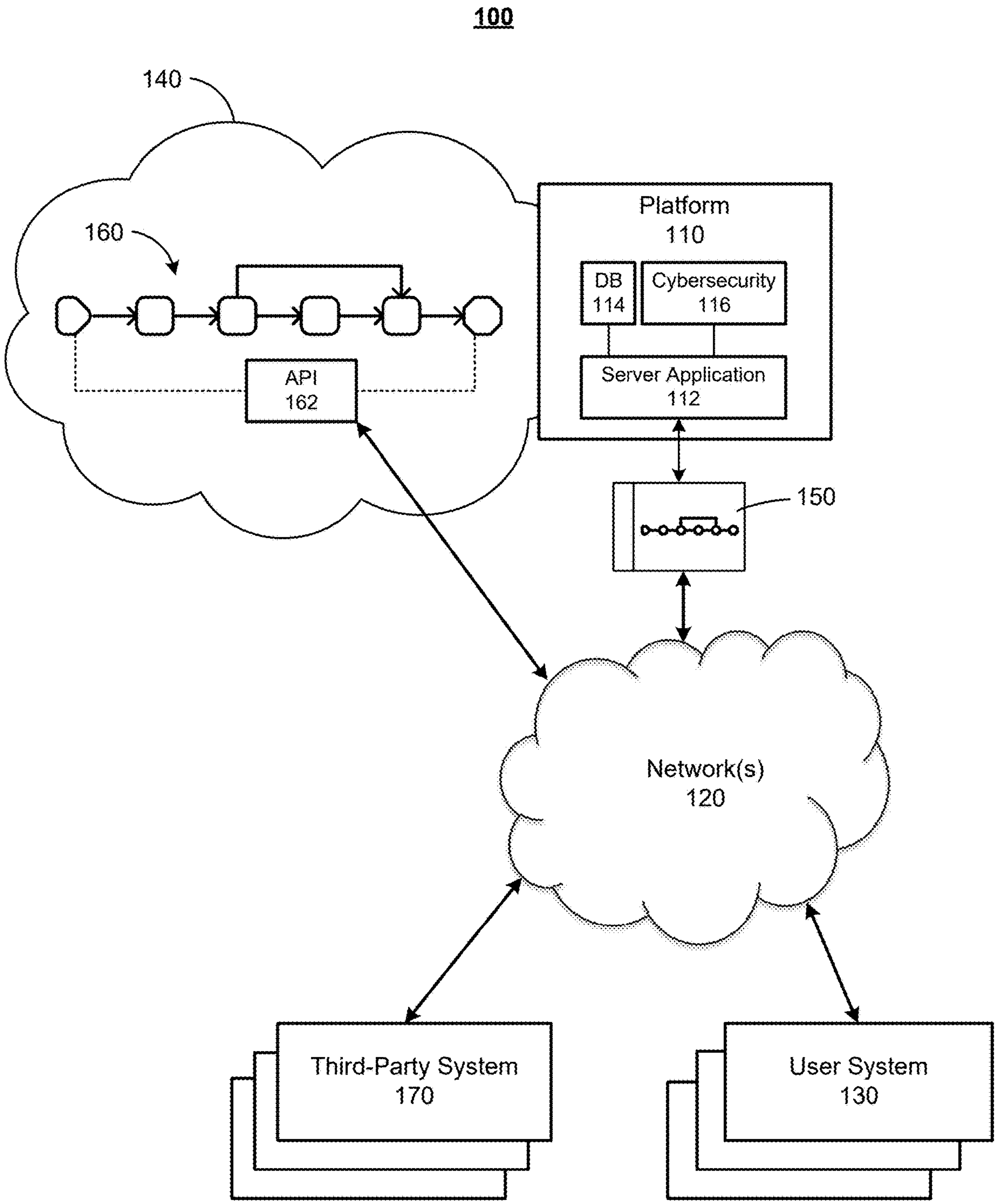
FIG. 1 illustrates an example infrastructure, in which one or more of the processes described herein may be implemented, according to an embodiment.

FIG. 1 illustrates an example infrastructure 100, in which one or more of the processes described herein may be implemented, according to an embodiment. Infrastructure 100 may comprise a platform 110 which hosts and/or executes one or more of the disclosed processes, which may be implemented in software and/or hardware. In particular, platform 110 may execute a server application 112, host a database 114 that may store data used by server application 112, and/or execute a cybersecurity module 116 that may process data generated by server application 112 and/or stored in database 114 and/or generate data for use by server application 112 and/or storage in database 114. Cybersecurity module 116 may be comprised in server application 112 (e.g., with one or a plurality of other modules) or be separate from server application 112 (e.g., and interact with server application 112 via an application programming interface). Platform 110 may comprise dedicated servers, or may instead be implemented in a computing cloud, in which the resources of one or more servers are dynamically and elastically allocated to multiple tenants based on demand. In either case, the servers may be collocated and/or geographically distributed.

Platform 110 may be communicatively connected to one or more networks 120. Network(s) 120 enable communication between platform 110 and user system(s) 130. Network(s) 120 may comprise the Internet, and communication through network(s) 120 may utilize standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to a plurality of user systems 130 through a single set of network(s) 120, it should be understood that platform 110 may be connected to different user systems 130 via different sets of one or more networks. For example, platform 110 may be connected to a subset of user systems 130 via the Internet, but may be connected to another subset of user systems 130 via an intranet.

While only a few user systems 130 are illustrated, it should be understood that platform 110 may be communicatively connected to any number of user system(s) 130 via network(s) 120. User system(s) 130 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, and/or the like. However, it is generally contemplated that a user system 130 would be the personal or professional workstation of an integration developer that has a user account for accessing server application 112 on platform 110. It should be understood that the integration developer may be anywhere from a novice, with little to no prior experience in integration development, to an expert, with many years of experience in integration development. When platform 110 is an iPaaS platform, each user account may be associated with an overarching organizational account for managing an integration platform on the iPaaS platform.

Server application 112 may manage an integration environment 140. In particular, server application 112 may provide a user interface 150 and backend functionality, including one or more of the processes disclosed herein, to enable users, via user systems 130, to construct, develop, modify, save, delete, test, deploy, un-deploy, and/or otherwise manage integration processes 160 within integration environment 140. User interface 150 may comprise a graphical user interface that implements a low-code environment, including potentially a no-code environment, in which users may construct integration processes 160.

The user of a user system 130 may authenticate with platform 110 using standard authentication means, to access server application 112 in accordance with permissions or roles of the associated user account. The user may then interact with server application 112 to manage one or more integration processes 160, for example, within a larger integration platform within integration environment 140. It should be understood that multiple users, on multiple user systems 130, may manage the same integration process(es) 160 and/or different integration processes 160 in this manner, according to the permissions or roles of their associated user accounts.

Although only a single integration process 160 is illustrated, it should be understood that, in reality, integration environment 140 may comprise any number of integration processes 160. In an embodiment, integration environment 140 supports integration platform as a service (iPaaS). In this case, integration environment 140 may comprise one or a plurality of integration platforms that each comprises one or a plurality of integration processes 160. Each integration platform may be associated with an organization, which may be associated with one or more user accounts by which respective user(s) manage the organization's integration platform, including the various integration process(es) 160.

An integration process 160 may represent a transaction involving the integration of data between two or more systems, and may comprise a series of elements that specify logic and transformation requirements for the data to be integrated. Each element, which may also be referred to herein as a "step" and have a visual representation referred to herein as a "shape," may transform, route, and/or otherwise manipulate data to attain an end result from input data. For example, a basic integration process 160 may receive data from one or more data sources (e.g., via an application programming interface 162 of the integration process 160), manipulate the received data in a specified manner (e.g., including mapping, analyzing, normalizing, altering, updating, enhancing, and/or augmenting the received data), and send the manipulated data to one or more specified destinations (e.g., via an application programming interface of each destination). An integration process 160 may represent a business workflow or a portion of a business workflow or a transaction-level interface between two systems, and comprise, as one or more elements, software modules that process data to implement the business workflow or interface. A business workflow may comprise any myriad of workflows of which an organization may repetitively have need. For example, a business workflow may comprise, without limitation, procurement of parts or materials, manufacturing a product, selling a product, shipping a product, ordering a product, billing, managing inventory or assets, providing customer service, ensuring information security, marketing, onboarding or offboarding an employee, assessing risk, obtaining regulatory approval, reconciling data, auditing data, providing information technology services, and/or any other workflow that an organization may implement in software.

The functionality of server application 112 may include a process for constructing an integration process 160 within one or more screens of a graphical user interface of user interface 150. Embodiments of such functionality are disclosed, for example, in U.S. Pat. No. 8,533,661, issued on Sep. 10, 2013, and U.S. Pat. No. 11,886,965, issued on Jan. 30, 2024, which are both hereby incorporated herein by reference as if set forth in full, and referred to hereafter as "the GUI applications." In particular, the GUI applications describe functionality that enable the construction of integration processes 160 on a virtual canvas.

Of particular relevance to disclosed embodiments, the graphical user interface may interact with cybersecurity module 116, during or after construction of integration process 160, to detect cybersecurity issues with the integration process 160. Cybersecurity module 116 may execute automatically in the background during construction of integration process 160, or may be executed in response to a user operation (e.g., selection of an input within the graphical user interface) or other triggering event. Preferably, cybersecurity module 116 is executed, for a given integration process 160, prior to deployment of that integration process 160 within a production environment of integration environment 140. However, alternatively, cybersecurity module 116 may be executed for a deployed integration process 160. Cybersecurity module 116, which will be discussed in greater detail elsewhere herein, may evaluate integration process 160, using artificial intelligence, to detect potential cybersecurity threats, if any, posed by the integration process 160, and report any cybersecurity threats to the user responsible for the integration process 160, or to another module or system.

Each integration process 160, when deployed, may be communicatively coupled to network(s) 120. For example, each integration process 160 may comprise an application programming interface (API) 162 that enables clients to access integration process 160 via network(s) 120. A client may push data to integration process 160 through application programming interface 162, and/or pull data from integration process 160 through application programming interface 162.

One or more third-party systems 170 may be communicatively connected to network(s) 120, such that each third-party system 170 may communicate with an integration process 160 in integration environment 140 via application programming interface 162. Third-party system 170 may host and/or execute a software application that pushes data to integration process 160 and/or pulls data from integration process 160, via application programming interface 162. Additionally or alternatively, an integration process 160 may push data to a software application on third-party system 170 and/or pull data from a software application on third-party system 170, via an application programming interface of the third-party system 170. Thus, third-party system 170 may be a client or consumer of one or more integration processes 160, a data source for one or more integration processes 160, and/or the like. As examples, the software application on third-party system 170 may comprise, without limitation, enterprise resource planning (ERP) software, customer relationship management (CRM) software, accounting software, and/or the like.

2. Example Processing System

Figure 2:
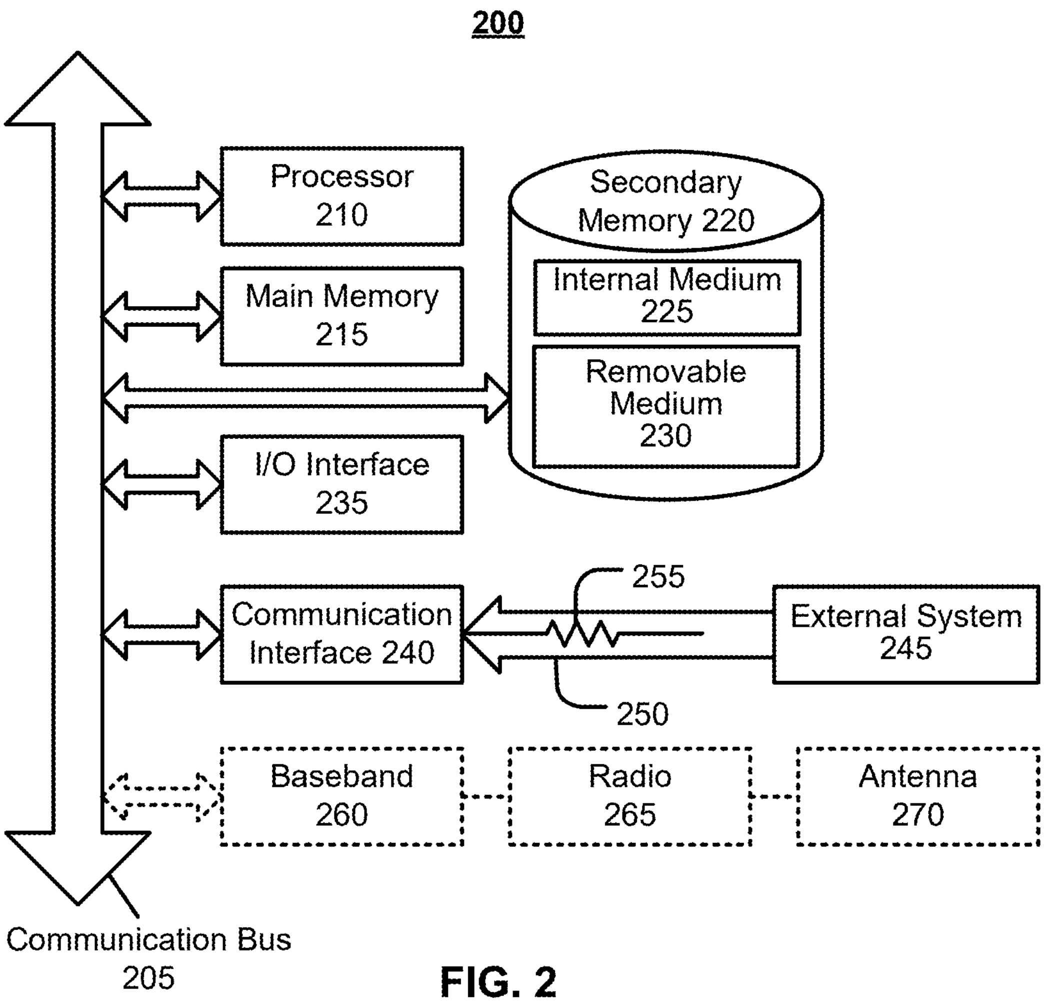
FIG. 2 illustrates an example processing system, by which one or more of the processes described herein may be executed, according to an embodiment.

FIG. 2 illustrates an example processing system, by which one or more of the processes described herein may be executed, according to an embodiment. For example, system 200 may be used to store and/or execute server application 112 and/or cybersecurity module 116, and/or may represent components of platform 110, user system(s) 130, third-party system 170, and/or other processing devices described herein. System 200 can be any processor-enabled device (e.g., server, personal computer, etc.) that is capable of wired or wireless data communication. Other processing systems and/or architectures may also be used, as will be clear to those skilled in the art.

System 200 may comprise one or more processors 210. Processor(s) 210 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a subordinate processor (e.g., back-end processor), an additional microprocessor or controller for dual or multiple processor systems, and/or a coprocessor. Such auxiliary processors may be discrete processors or may be integrated with a main processor 210. Examples of processors which may be used with system 200 include, without limitation, any of the processors (e.g., Pentium™, Core i7™, Core i9™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, any of the processors available from Nvidia Corporation of Santa Clara, California, and/or the like.

Processor(s) 210 may be connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 200 may comprise main memory 215. Main memory 215 provides storage of instructions and data for programs executing on processor 210, such as any of the software discussed herein. It should be understood that programs stored in the memory and executed by processor 210 may be written and/or compiled according to any suitable language, including without limitation C/C++, Java, JavaScript, Perl, Python, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

System 200 may comprise secondary memory 220. Secondary memory 220 is a non-transitory computer-readable medium having computer-executable code and/or other data (e.g., any of the software disclosed herein) stored thereon. In this description, the term "computer-readable medium" is used to refer to any non-transitory computer-readable storage media used to provide computer-executable code and/or other data to or within system 200. The computer software stored on secondary memory 220 is read into main memory 215 for execution by processor 210. Secondary memory 220 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Secondary memory 220 may include an internal medium 225 and/or a removable medium 230. Internal medium 225 and removable medium 230 are read from and/or written to in any well-known manner. Internal medium 225 may comprise one or more hard disk drives, solid state drives, and/or the like. Removable storage medium 230 may be, for example, a magnetic tape drive, a compact disc (CD) drive, a digital versatile disc (DVD) drive, other optical drive, a flash memory drive, and/or the like.

System 200 may comprise an input/output (I/O) interface 235. I/O interface 235 provides an interface between one or more components of system 200 and one or more input and/or output devices. Examples of input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing systems, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch-panel display (e.g., in a smartphone, tablet computer, or other mobile device).

System 200 may comprise a communication interface 240. Communication interface 240 allows software to be transferred between system 200 and external devices, networks, or other information sources. For example, computer-executable code and/or data may be transferred to system 200 from a network server via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 120) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software transferred via communication interface 240 is generally in the form of electrical communication signals 255. These signals 255 may be provided to communication interface 240 via a communication channel 250 between communication interface 240 and an external system 245. In an embodiment, communication channel 250 may be a wired or wireless network (e.g., network(s) 120), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code is stored in main memory 215 and/or secondary memory 220. Computer-executable code can also be received from an external system 245 via communication interface 240 and stored in main memory 215 and/or secondary memory 220. Such computer-executable code, when executed, enables system 200 to perform one or more of the various processes disclosed herein.

In an embodiment that is implemented using software, the software may be stored on a computer-readable medium and initially loaded into system 200 by way of removable medium 230, I/O interface 235, or communication interface 240. In such an embodiment, the software is loaded into system 200 in the form of electrical communication signals 255. The software, when executed by processor 210, may cause processor 210 to perform one or more of the various processes disclosed herein.

System 200 may optionally comprise wireless communication components that facilitate wireless communication over a voice network and/or a data network (e.g., in the case of user system 130). The wireless communication components comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, baseband system 260 decodes the signal and converts it to an analog signal. Then, the signal is amplified and sent to a speaker. Baseband system 260 also receives analog audio signals from a microphone. These analog audio signals are converted to digital signals and encoded by baseband system 260. Baseband system 260 also encodes the digital signals for transmission and generates a baseband transmit audio signal that is routed to the modulator portion of radio system 265. The modulator mixes the baseband transmit audio signal with an RF carrier signal, generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 may be communicatively coupled with processor(s) 210, which have access to memory 215 and 220. Thus, software can be received from baseband processor 260 and stored in main memory 210 or in secondary memory 220, or executed upon receipt. Such software, when executed, can enable system 200 to perform one or more of the various processes disclosed herein.

3. Data Flow

Figure 3:
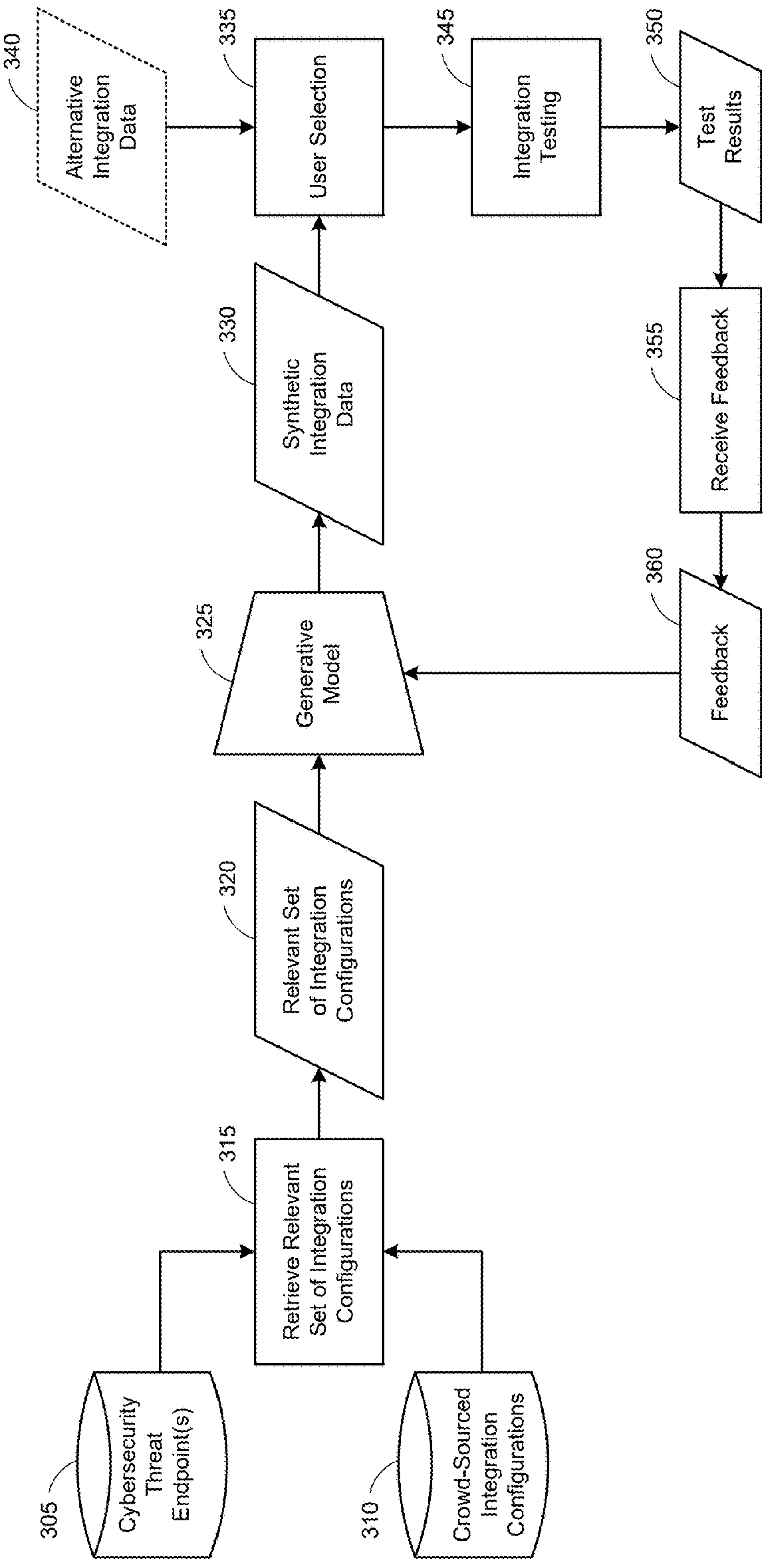
FIG. 3 illustrates an example data flow for artificial-intelligence-based proactive cybersecurity for integration processes, according to an embodiment.

FIG. 3 illustrates an example data flow 300 for artificial-intelligence-based proactive cybersecurity for integration processes 160, according to an embodiment. Data flow 300 may be implemented by server application 112 and/or cybersecurity module 116 (e.g., which may be comprised in or be communicatively coupled to server application 112). The illustrated modules are preferably implemented as software modules, but could also be implemented as hardware modules or as modules comprising a combination of hardware and software.

Data flow 300 may be performed for each of a plurality of integration processes 160. Data flow 300 is preferably performed during the design phase of an integration process 160, prior to deployment of integration process 160 in a production environment of integration environment 140. For example, data flow 300 may be performed in response to a user operation, such as the selection of an input for testing an integration process 160 that has been constructed or is under construction within a graphical user interface of user interface 150. The graphical user interface may comprise a virtual canvas on which a user may drag and drop and connect shapes, representing steps that perform specific functions within integration process 160. Thus, the user may intuitively construct an integration process 160 by simply placing shapes on the virtual canvas and connecting those shapes together, to define data flows between the steps represented by those shapes. When the user is ready, the user may select an input, within the graphical user interface, for testing the integration process 160, currently represented on the virtual canvas. Alternatively, data flow 300 may be performed automatically in the background as the user is constructing the integration process 160 or in response to some other triggering event.

Platform 110 may store (e.g., in database 114) one or more, and generally a plurality of, cybersecurity threat endpoints 305. Alternatively, platform 110 may retrieve cybersecurity threat endpoint(s) 305 on demand, for example, from one or more third-party systems 170 or the user's user system 130. Cybersecurity threat endpoint(s) 305 may be identified and/or compiled by third-party cybersecurity services, by the user, by an operator of platform 110, and/or the like. Platform 110 may collect the cybersecurity threat endpoint(s) 305 from one or a plurality of these and/or other sources, including public and/or private sources.

Cybersecurity threat endpoint(s) 305 may comprise any potential endpoint for a cybersecurity threat. Examples of endpoints include, without limitation, a connector of an integration process 160 (e.g., a step that receives or sends data), a step of an integration process 160 that accesses a database, a function provided by application programming interface 162 for an integration process 160, an open port, and/or the like. Examples of cybersecurity threats include, without limitation, the injection of malware (e.g., viruses, trojan horses, ransomware, etc.), unauthorized data access (e.g., via unpatched vulnerabilities, weak passwords, etc.), data exfiltration (e.g., the unauthorized transfer of data from an integration process 160, data leaks, etc.), data infiltration (e.g., Structured Query Language (SQL) injection, etc.), and/or the like.

Platform 110 may store (e.g., in database 114) a plurality of crowd-sourced integration configurations 310. Each of the plurality of crowd-sourced integration configurations 310 may be a configuration of an integration process 160, represented in any suitable data structure. The configuration of an integration process 160 may comprise the structure of the integration process 160 (e.g., the steps and connections), the value of each configurable parameter, the value of each fixed parameter, and/or the like. The integration processes 160, for which configurations are included in crowd-sourced integration configurations 310, may comprise previously executed integration processes 160 that were successfully executed, unsuccessfully executed (e.g., failed), the subject of a successful cyberattack, the subject of an unsuccessful cyberattack, and/or the like. Crowd-sourced integration configurations 310 may be anonymized to remove any personally identifiable information (PII) or other confidential or sensitive information.

Crowd-sourced integration configurations 310 may be crowd-sourced from a plurality of integration platforms managed through platform 110, which may be an iPaaS platform, such as the Boomi® iPaaS platform. In other words, each of the crowd-sourced integration configurations 310 may be a configuration of an integration process 160 on one of the plurality of integration platforms. The iPaaS platform may support a plurality of integration platforms, each managed by a different organizational account that is associated with one or more user accounts. Thus, crowd-sourced integration configurations 310 will primarily represent integration processes 160 developed by other users for other organizations, but could also represent integration processes 160 developed by the same user or developed by another user for the same organization. In any case, crowd-sourced integration data 310 may represent a massive repository (e.g., thousands, tens of thousands, hundreds of thousands, millions, tens of millions, hundreds of millions, billions, tens of billions, hundreds of billions, or more integration configurations) of previously executed integration processes 160. This repository will generally be very diverse in terms of structures, configurable parameter values, applications, inputs and outputs, and the like, and potentially crowd-sourced from a diverse group of different organizations. Crowd-sourced integration configurations 310 may used by artificial intelligence (AI) of platform 110, including the artificial intelligence described herein (e.g., implemented by cybersecurity module 116), to learn integration pathways. In other words, this massive repository of crowd-sourced integration configurations 310 may be leveraged to train any integration-related artificial intelligence, including the disclosed artificial intelligence for improved cybersecurity.

Module 315 may retrieve a relevant set 320 of integration configurations, representing relevant integration pathways, from crowd-sourced integration configurations 310. In an embodiment, relevant set 320 of integration configurations is extracted from crowd-sourced integration configurations 310 based on a set of one or more, and potentially all, cybersecurity threat endpoints 305 and/or a configuration of the specific integration process 160 to be tested. In other words, module 315 may build a relevant set 320 of integration configurations, that is relevant to the specific integration process 160 to be tested, from cybersecurity threat endpoints 305 and crowd-sourced integration configurations 310. For example, relevant set 320 may comprise integration configurations, from crowd-sourced integration configurations 310, that are similar in configuration (e.g., structure, parameter values, integration pathways, etc.) to the specific integration process 160, comprise one or more of cybersecurity threat endpoints 305, and/or the like.

A generative model 325 may be applied to relevant set 320 of integration configurations. In an embodiment, generative model 325 comprises an artificial neural network, such as a deep neural network (e.g., a transformer neural network, recurrent neural network, graph-based neural network, etc.), feed-forward neural network, and/or the like. The artificial neural network may be trained using a generative adversarial network (GAN), which is described in greater detail elsewhere herein. In an alternative embodiment, generative model 325 may comprise another type of artificial intelligence, such as a connectivity map.

In any case, generative model 325 is designed to generate a dataset that can be used as input to integration process 160 during testing. In particular, generative model 325 may accept one or more integration configurations as an input, and output synthetic integration data 330 that represent suitable inputs to an integration process 160 having those integration configuration(s). Thus, assuming that the integration configuration(s) that are input to generative model 325 are relevant to (e.g., representing an identical or similar configuration to) the specific integration process 160 being tested, synthetic integration data 330 will comprise integration data that are relevant to the specific integration process 160 being tested. Integration data that are relevant to an integration process 160 refers to data that may be input to the integration process 160 and which are similar in nature to real inputs that integration process 160 would process during execution of integration process 160 within a production environment. For example, synthetic integration data 330 may comprise field values in an input schema defined for integration process 160, a call to a function of application programming interface 162 of integration process 160, communication with application programming interface 162 of integration process 160 via a specific port, and/or the like. In an embodiment, synthetic integration data 330 are generated to implicate (e.g., trigger) the specific cybersecurity threat scenario(s) represented by cybersecurity threat endpoint(s) 305.

Generative model 325 may be a generative language model. The generative language model may comprise or consist of a large language model, such as the Generative Pre-trained Transformer (GPT). GPT-4 is the fourth-generation language prediction model in the GPT-n series, created by OpenAI™ of San Francisco, California. GPT-4 is an autoregressive language model that uses deep learning to produce human-like text. GPT-4 has been pre-trained on a vast amount of text from the open Internet. While GPT-4 is provided as an example, it should be understood that the generative language model may be any generative language model, including past and future generations of GPT, as well as other large language models, such as any of the Claude family of large language models (e.g., Claude 3 Opus) developed by Anthropic PBC of San Francisco, California, the Falcon large language model (e.g., Falcon 180B) released by the United Arab Emirates'Technology Innovation Institute (TII), the Large Language Model Meta AI (LLaMA) model (e.g., LLaMA 2) released by Meta AI of New York, New York, the Gemini model developed by Google DeepMind of London, United Kingdom, the Mistral family of models released by Mistral AI of Paris, France, and the like. Alternatively or additionally, the generative language model may comprise or consist of a code-completion model that is trained to produce source code, data structures represented in a markup language (e.g., XML, HTML, etc.) or other format, and/or the like. In any case, a pre-trained generative language model may used as a base model that is fine tuned (e.g., via a generative adversarial network) for the intended task of generating synthetic integration data 330, to produce generative model 325.

In an embodiment in which generative model 325 is a generative language model, a prompt may be generated for each integration configuration or subset of two or more integration configurations in relevant set 320, based on the integration configuration(s). Each prompt may then be input to generative model 325, to produce synthetic integration data 330 that are relevant to an integration process 160 having the integration configuration(s) represented in the prompt. The prompt may be generated, for example, by inserting a representation of the integration configuration(s) into a predefined template. The predefined template may comprise a pre-conversation and/or post-conversation, which provide context and/or instructions for the generative language model, and a placeholder into which the representation of the integration configuration(s) is inserted. The pre-conversation and/or post-conversation may define the role of the generative language model (e.g., to produce synthetic inputs to the integration process 160 represented by the integration configuration(s) represented in the prompt), define an output format for the generative language model (e.g., a list structure, a hierarchical structure, a markup-language structure, etc.), and/or the like.

Module 335 may enable a user to select between synthetic integration data 330, generated by generative model 325, and alternative integration data 340, if available. Alternative integration data 340 may comprise any integration data from any source other than generative model 325. For example, alternative integration data 340 may be derived manually by the user (e.g., from the user's own integration data), acquired from a third-party system 170, and/or the like. It should be understood that alternative integration data 340 may be derived from one or a plurality of sources. A user may interact with module 335, via one or more inputs in the graphical user interface, to select either select synthetic integration data 330 or alternative integration data 340 for use in testing integration process 160. In some cases, there may be no alternative integration data 340, in which case the user may interact with module 335 to confirm the use of synthetic integration data 330. In other cases, the user may select both synthetic integration data 330 and alternative integration data 340.

In an embodiment, module 335 enables the user to filter synthetic integration data 330, prior to testing integration process 160, based on one or more criteria. This filtering may comprise extracting a subset of previously generated synthetic integration data 330 and/or generating new synthetic integration data 330, according to the criteria. For example, the criteria may comprise or consist of a number of instances of synthetic integration data 330 to be used for testing integration process 160. In this case, the user may define, via module 335, the number of instances of synthetic integration data 330 to be extracted from previously generated synthetic integration data 330 and/or to be newly generated by generative model 325. As used herein, an "instance" of synthetic integration data 330 represents one test input to integration process 160. As an additional or alternative example of the criteria, the criteria may comprise or consist of at least one cybersecurity threat endpoint 305 of interest or concern. In this case, the user may specify one or more cybersecurity endpoints 305 via module 335, and module 335 may extract and/or generate synthetic integration data 330 exclusively or primarily for the specified cybersecurity threat endpoint(s) 305. In this manner, the user may shape synthetic integration data 330 to address specific cybersecurity threats. It should be understood that other criteria may be provided by module 335, for the user's utilization, in a similar manner.

Module 345 performs integration testing on the specific integration process 160 being tested, using the integration data that were selected via module 335. It should be understood that the selected integration data may comprise synthetic integration data 330 and/or alternative integration data 340. Module 345 may deploy the specific integration process 160 within a test environment of integration environment 140. It should be understood that the test environment is separate and isolated from the production environment, such that actions within the test environment have no impact on data within the production environment. Module 345 may perform the integration testing in any suitable manner. In an embodiment, module 345 is an autonomous software entity designed to continuously detect, prevent, and respond to security issues at the integration layer.

Module 345 may input each instance in the selected integration data to integration process 160, executing within the test environment, and monitor or scan the operation of integration process 160, to detect any abnormal behavior of integration process 160 during operation. Abnormal behavior may comprise an error event produced by integration process 160 (e.g., failure of integration process 160), a warning event produced by integration process 160, a decrease in performance of integration process 160, a malicious action performed by integration process 160, and/or the like. It should be understood that the selected integration data, that are input to the specific integration process 160 during testing, may be designed (e.g., by generative model 325) to elicit such abnormal behaviors. Module 345 may utilize the selected integration data to run various cybersecurity scenarios, representing cybersecurity threats, against integration process 160, and determine how integration process 160 performs in those cybersecurity scenarios.

Module 345 may collect the abnormal behaviors associated with the specific integration process 160, during execution of integration process 160 within the test environment. In the event that multiple integration processes 160 are being tested simultaneously, module 345 may associate each abnormal behavior with the respective integration process 160, exhibiting that behavior, based on a unique integration identifier associated with each integration process 160. Module 345 may output a representation of the abnormal behavior(s), associated with each integration process 160, as test results 350. Test results 350 may comprise a list of cybersecurity threats, as represented by the abnormal behavior(s) associated with integration process 160, to which integration process 160 is vulnerable. Test results 350 may be output to a user (e.g., via the graphical user interface), another module (e.g., of server application 112), and/or another system (e.g., a third-party system 170).

Module 345 may execute a testing process that comprises scanning each integration process 160 for known threats. In a first test of the testing process, an automated testing script may traverse or parse the configuration of integration process 160 to identify known security risks (e.g., open ports). Once integration process 160 passes this first test, module 345 may compile and deploy integration process 160 to the test environment. Then, in a second test of the testing process, an automated testing suite may be run against integration process 160 in the test environment. This second test may comprise spinning up a virtual machine that functions in the same manner as a deployment in the production environment. Then, while the compiled code (e.g., bytecode) of integration process 160 is executed on that virtual machine, the automated testing suite tests integration process 160 for known security threats. Module 345 may select the particular tests to be included in the automated testing suite based on a type of integration process 160. For example, if integration process 160 represents a database integration (e.g., integrating data into or from a database), the automated testing suite may be selected to include database security tests. Similarly, if integration process 160 represents an API integration (e.g., receives data and/or sends data through an application programming interface), the automated testing suite may be selected to include API security tests. It should be understood that the automated testing suite may be selected in a similar manner for other types of integration processes 160, and that a single integration process 160 may represent one or a plurality of types, such that the automated testing suite may include tests for a plurality of different types of integration processes 160.

Module 355 may receive feedback 360 regarding test results 350. Feedback 360 may be received from a user (e.g., via the graphical user interface), another module (e.g., of server application 112), and/or another system (e.g., a third-party system 170). Feedback 360 may indicate the quality, including potentially the accuracy, of test results 350, which may reflect the quality of the integration data that were used for integration testing in module 345. Of particular relevance to disclosed embodiments, feedback 360 may reflect the quality of synthetic integration data 330. In this case, when feedback 360 is negative, thereby indicating that the quality of synthetic integration data 330 is low, generative model 325 may be updated based on feedback 360. In particular, generative model 325 may be retrained, for example, using a new relevant set 320 of integration configurations. In this manner, generative model 325 is self-learning.

It should be understood that a user may utilize test results 350 to improve the cybersecurity of integration process 160. For example, if test results 350 indicate the existence of a cybersecurity threat to integration process 160, the user may revise integration process 160 within the graphical user interface (e.g., using a virtual canvas) to eliminate or otherwise mitigate the cybersecurity threat. Thus, cybersecurity threats may be proactively addressed within integration process 160, prior to deployment of integration process 160 within a production environment of integration environment 140.

In an alternative or additional embodiment, test results 350 may be utilized to determine whether or not integration process 160 may be deployed. For example, if test results 350 indicate that integration process 160 is vulnerable to a set of one or more cybersecurity threats that are considered severe (e.g., if test results 350 comprise one of the cybersecurity threats in this set), server application 112 may prevent that integration process 160 from being deployed. In this case, if the user attempts to deploy integration process 160, the deployment may be automatically blocked, and the graphical user interface may display an alert that notifies the user of the cybersecurity threat(s), and either indicates that integration process 160 cannot be deployed or requires the user to explicitly override the blocked deployment.

4. Process

Figure 4:
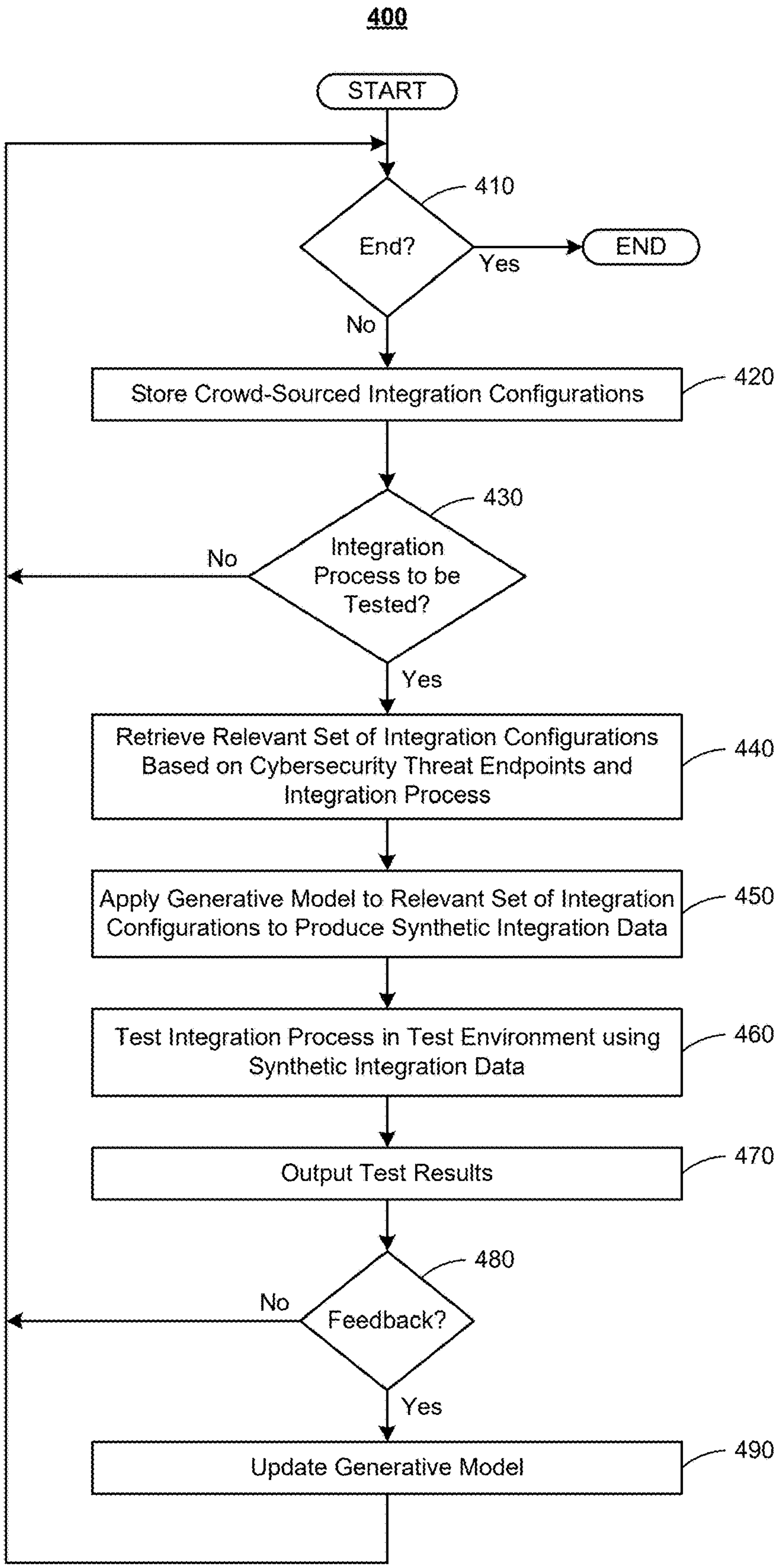
FIG. 4 illustrates a process for artificial-intelligence-based proactive cybersecurity for integration processes, according to an embodiment.

FIG. 4 illustrates a process 400 for artificial-intelligence-based proactive cybersecurity for integration processes 160, according to an embodiment. Process 400 may be implemented in server application 112 and/or cybersecurity module 116. While process 400 is illustrated with a certain arrangement and ordering of subprocesses, process 400 may be implemented with fewer, more, or different subprocesses and a different arrangement and/or ordering of subprocesses. Furthermore, any subprocess, which does not depend on the completion of another subprocess, may be executed before, after, or in parallel with that other independent subprocess, even if the subprocesses are described or illustrated in a particular order.

Subprocess 410 may determine whether or not to end process 400. Subprocess 410 may determine to end process 400 when server application 112 or cybersecurity module 116 is terminated, in response to a user operation, in response to another trigger, and/or the like. When determining to end (i.e., "Yes" in subprocess 410), process 400 may end. Otherwise, when not determining to end (i.e., "No" in subprocess 410), process 400 may proceed to subprocess 420.

Subprocess 420 may store crowd-sourced integration configurations 310, for example, from a plurality of integration platforms managed on platform 110, which may be an iPaaS platform. Each of crowd-sourced integration configurations 310 may be a configuration of an integration process 160 on one of the plurality of integration platforms, as discussed elsewhere herein. Crowd-sourced integration configurations 310 may be stored in real time, as new integration processes 160 are created or executed on the integration platforms, or periodically for integration processes 160 that were created or executed since the last periodic storage. It should be understood that subprocess 420 may be performed in parallel with and independently of any of the other subprocesses of process 400.

Subprocess 430 may determine whether or not a specific integration process 160 is to be tested. When determining that a specific integration process 160 is to be tested (i.e., "Yes" in subprocess 430), process 400 may proceed to subprocess 440. Otherwise, when not determining that a specific integration process 160 is to be tested (i.e., "No" in subprocess 430), process 400 may return to subprocess 410 to wait for a specific integration process 160 to be tested or else for process 400 to end, while continuing to store crowd-sourced integration configurations 310.

Subprocess 440, which may be implemented by module 315, may retrieve a relevant set 320 of integration configurations from crowd-sourced integration configurations 310, stored in subprocess 420, based on a set of one or more cybersecurity threat endpoints 305 and a configuration of the specific integration process 160 to be tested, as determined in subprocess 430. For example, subprocess 440 may retrieve, as relevant set 320, those crowd-sourced integration configurations 310 that have identical and/or similar configurations as integration process 160 and comprise or otherwise implicate at least one of cybersecurity threat endpoints 305.

Subprocess 450 may apply generative model 325 to relevant set 320 of integration configurations, retrieved in subprocess 440. For example, generative model 325 may comprise or consist of a generative language model (e.g., large language model), and subprocess 450 may, for each integration configuration within relevant set 320, generate a prompt that comprises a representation of that integration configuration, and input the prompt to generative model 325. The prompt may instruct generative model 325 to output one or more instances of synthetic integration data 330 to be input to the integration process 160 to be tested. An instance of synthetic integration data 330 may comprise or consist of a set of field values in an input schema defined for integration process 160, a call to a function of application programming interface 162 of integration process 160, communication with application programming interface 162 of integration process 160 via a specific port, and/or the like.

Subprocess 460, which may be implemented by module 345, may test integration process 160 by inputting synthetic integration data 330 into integration process 160, while integration process 160 is executing within a test environment, to produce test results 350. In particular, subprocess

460 may input an instance of synthetic integration data 330 to integration process 160 and monitor the behavior of integration process 160 in processing the instance of synthetic integration data 330. Subprocess may record any abnormal behavior that is observed while monitoring the specific integration process 160, and produce test results 350, comprising any cybersecurity threats, based on any abnormal behaviors that are observed.

Subprocess 470 may output test results 350, for example, to a user, another module, another system, and/or the like. For instance, test results 350 may be visually represented to the user within the graphical user interface, to enable the user to address any cybersecurity threats indicated in test results 350. As an additional or alternative example, test results 350 may be provided as an input to an autonomous threat-resolution module that evaluates integration process 160 against the cybersecurity threats, indicated in test results 350, to automatically modify or propose modifications (e.g., to the user) to the configuration of integration process 160, in order to resolve each cybersecurity threat indicated in test results 350.

In an embodiment, when test results 350 comprise one or more of a set of cybersecurity threats (e.g., a set of cybersecurity threats that are considered severe), subprocess 470 may block or initiate blocking of the deployment of integration process 160 to a production environment of integration environment 140. In this case, integration process 160 cannot be deployed to the production environment until the cybersecurity threat(s) are resolved. However, in an embodiment, the user may be provided with an option to override the blocked deployment, to thereby deploy integration process 160 to the production environment, despite the cybersecurity threat(s).

Subprocess 480, which may be implemented by module 355, may determine whether or not feedback 360 is received for test results 350. As discussed elsewhere herein, feedback 360 may represent the quality of synthetic integration data 330. When determining that feedback 360 is received (i.e., "Yes" in subprocess 480), process 400 may proceed to subprocess 490. Otherwise, when determining that no feedback 360 is received (i.e., "No" in subprocess 480), process 400 may return to subprocess 410.

Subprocess 490 may update generative model 325, based on feedback 360 received in subprocess 480. For example, generative model 325 may be retrained, using a new relevant set 320 of integration configurations. This retraining may utilize the same method by which generative model 325 was initially trained. In an embodiment, generative model 325 is trained and retrained utilizing a generative adversarial network, as discussed elsewhere herein.

5. Training of Generative Model

Figure 5:
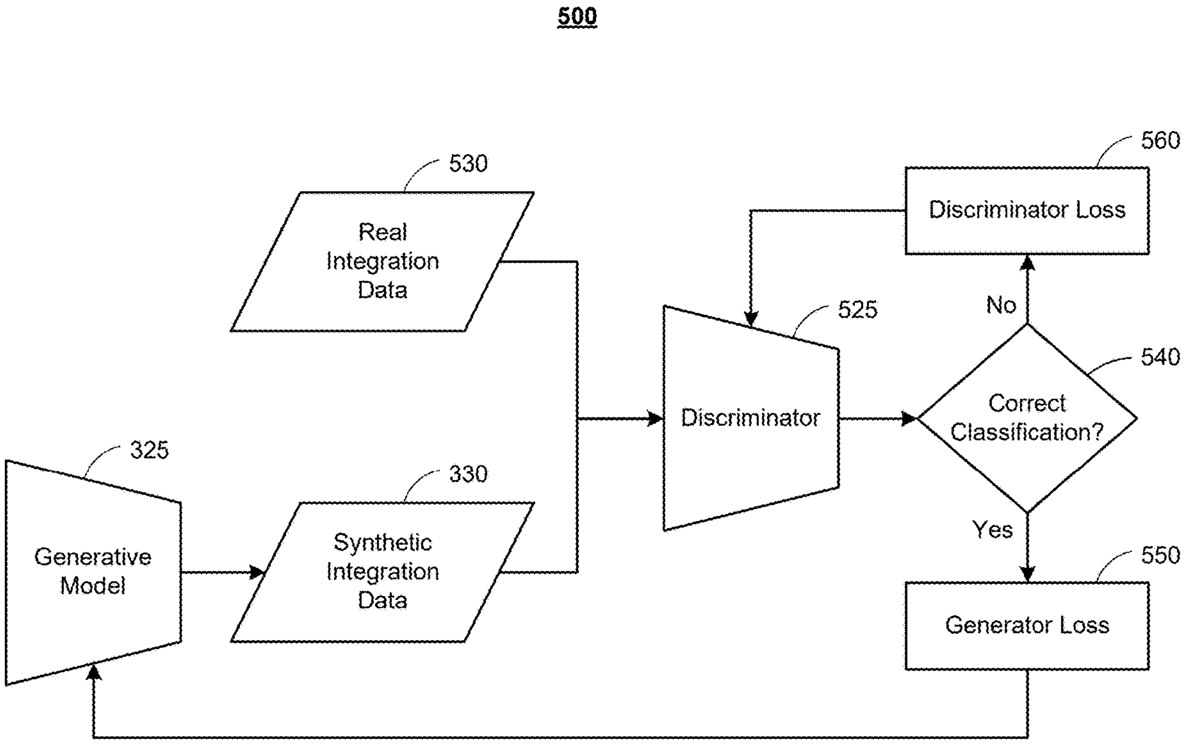
FIG. 5 illustrates the training of a generative model, according to an embodiment.

FIG. 5 illustrates the training of generative model 325, according to an embodiment in which generative model 325 is trained using a generative adversarial network (GAN). A generative adversarial network is a type of machine-learning model that learns to generate new data using two neural networks: a generator, which in this case is generative model 325; and a discriminator 525. Generative model 325 starts with random noise as an input, and transforms that random noise into synthetic integration data 330. Discriminator classifies each input, which may consist of an instance of real integration data 530 or synthetic integration data 330, as either real or fake/synthetic (e.g., by assigning a high probability to real integration data and a low probability to synthetic integration data).

Generative model 325 and discriminator 525 "compete" in a game in which discriminator 525 attempts to classify each input as either real or synthetic integration data, and generative model 325 attempts to generate synthetic integration data 330 that is sufficiently similar to real integration data 530 to fool discriminator 525 into classifying synthetic integration data 330 as real integration data. In particular, discriminator 525 classifies each instance of real integration data 530 and each instance of synthetic integration data 330, output by generative model 325, into a real class or a fake class. When discriminator 525 outputs the correct classification (i.e., "Yes" in subprocess 540) for synthetic integration data 330, generative model 325 is updated (e.g., by updating weights within the neural network of generative model 325 using any suitable technique) according to a generator loss 550. In this manner, generative model 325 improves at generating synthetic integration data 330 that is similar to real integration data 530. On the other hand, when discriminator 525 outputs the incorrect classification (i.e., "No" in subprocess 540), discriminator 525 is updated (e.g., by updating weights within the neural network of discriminator 525 using any suitable technique) according to a discriminator loss 560. In this manner, discriminator 525 improves at distinguishing between synthetic integration data 330 and real integration data 530. In other words, generative model 325 and discriminator 525 are trained in an adversarial process in which both models improve their skills over time, in a feedback loop, through a zero-sum game. Ideally, this adversarial process will converge within an acceptable tolerance, such that generative model 325 will produce synthetic integration data 330 that are indistinguishable from real integration data 530, and discriminator 525 will classify the integration data with approximately a 50% accuracy.

6. Graphical User Interface

Boomi® provides an iPaaS platform that has revolutionized the integration/middleware space with a drag-and-drop graphical user interface that eliminates the need for custom code in the construction of integration processes 160. In particular, the graphical user interface comprises a virtual canvas over which a user may drag and drop shapes, representing steps that perform specific functions, and connect the shapes to define data flows between their respective functions. Thus, the user may intuitively construct an integration process 160 by simply adding, configuring, and connecting shapes in an intuitive manner, within a low-code integration environment.

Figure 6A:
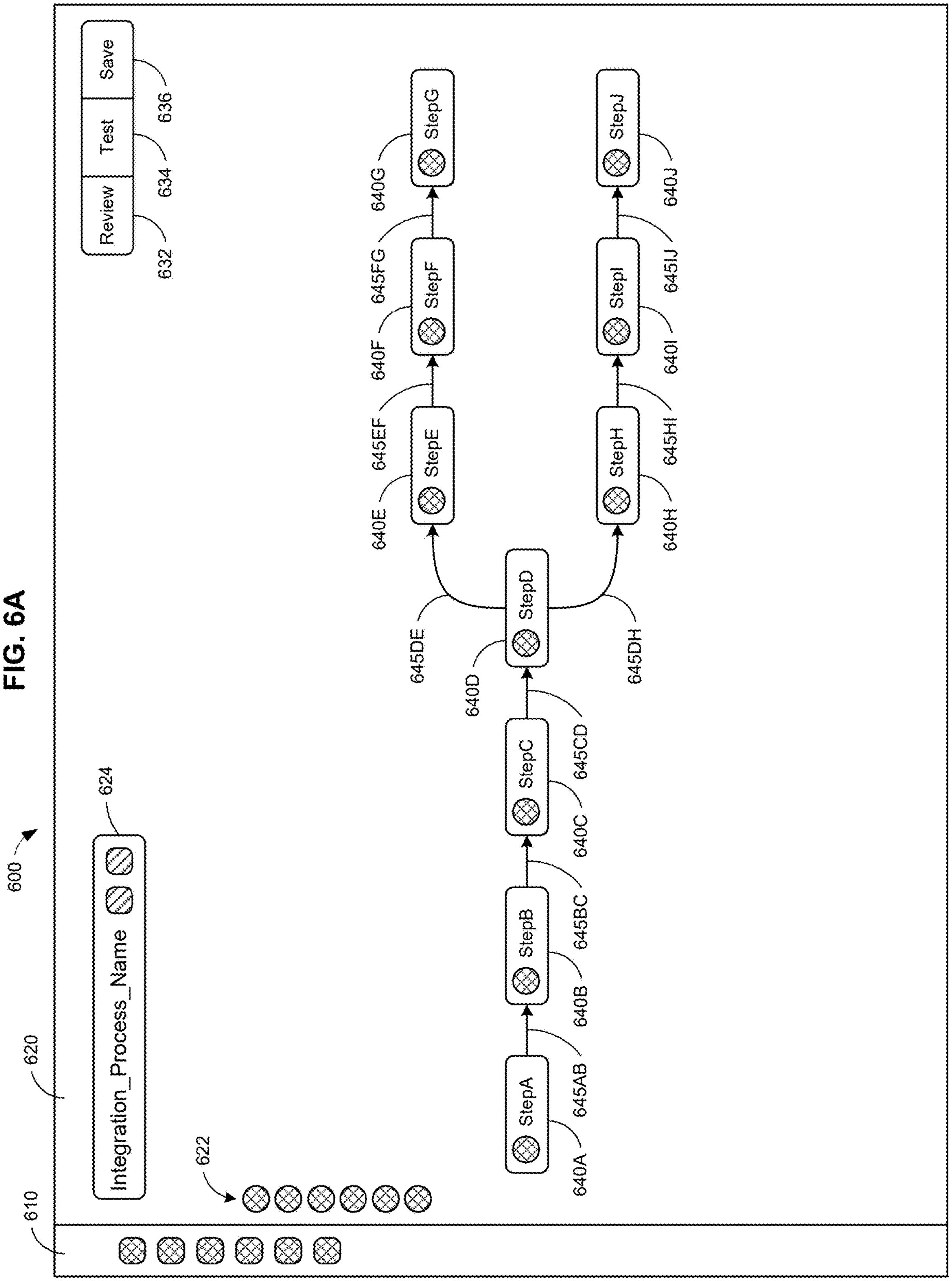
FIGS. 6A and 6B illustrate an example of a graphical user interface, according to an embodiment.

FIG. 6A illustrates an example graphical user interface 600 that may be used to construct an integration process 160, according to an embodiment. Graphical user interface 600 may be provided by user interface 150 of server application 112. In the illustrated example, graphical user interface 600 comprises a navigation bar 610 and a virtual canvas 620. Virtual canvas 620 enables a user to drag and drop representations (i.e., "shapes") of steps at positions within an integration process 160 to be constructed, and connect those representations to form one or more integration pathways for integration data to flow through the integration process 160.

Virtual canvas 620 may comprise a shape palette 622, from which new shapes can be dragged and dropped on virtual canvas 620, and a header 624 which may comprise information (e.g., name) for the integration process 160 as a whole. In addition, virtual canvas 620 may comprise a review input 632 for triggering an error prediction function and/or other analysis of integration process 160, a test input

634 for testing integration process 160 (e.g., deploying integration process 160 to a test environment, as implemented by module 345 in subprocess 460), and a save input 636 for saving integration process 160 in the current configuration.

In the illustrated example, a user has constructed an integration process 160 with shapes 640A, 640B, 640C, 640D, 640E, 640F, 640G, 640H, 640I, and 640J, which each represents a step in integration process 160. Each of shapes 640 is connected to at least one adjacent shape 640 by a connection 645. In the illustrated example, shape 640A is connected to shape 640B by connection 645AB, shape 640B is connected to shape 640C by connection 645BC, shape 640C is connected to shape 640D by connection 645CD, shape 640D represents a branch that is connected to shape 640E by connection 645DE and is connected to shape 640H by connection 645DH, shape 640E is connected to shape 640F by connection 645EF, shape 640F is connected to shape 640G by connection 645FG, shape 640H is connected to shape 640I by connection 645HI, and shape 640I is connected to shape 640J by connection 645IJ. Because shape 640D represents a branch, there are two possible integration pathways through integration process 160: 640A-640B-640C-640D-640E-640F-640G; and 640A-640B-640C-640D-640H-640I-640J.

Figure 6B:
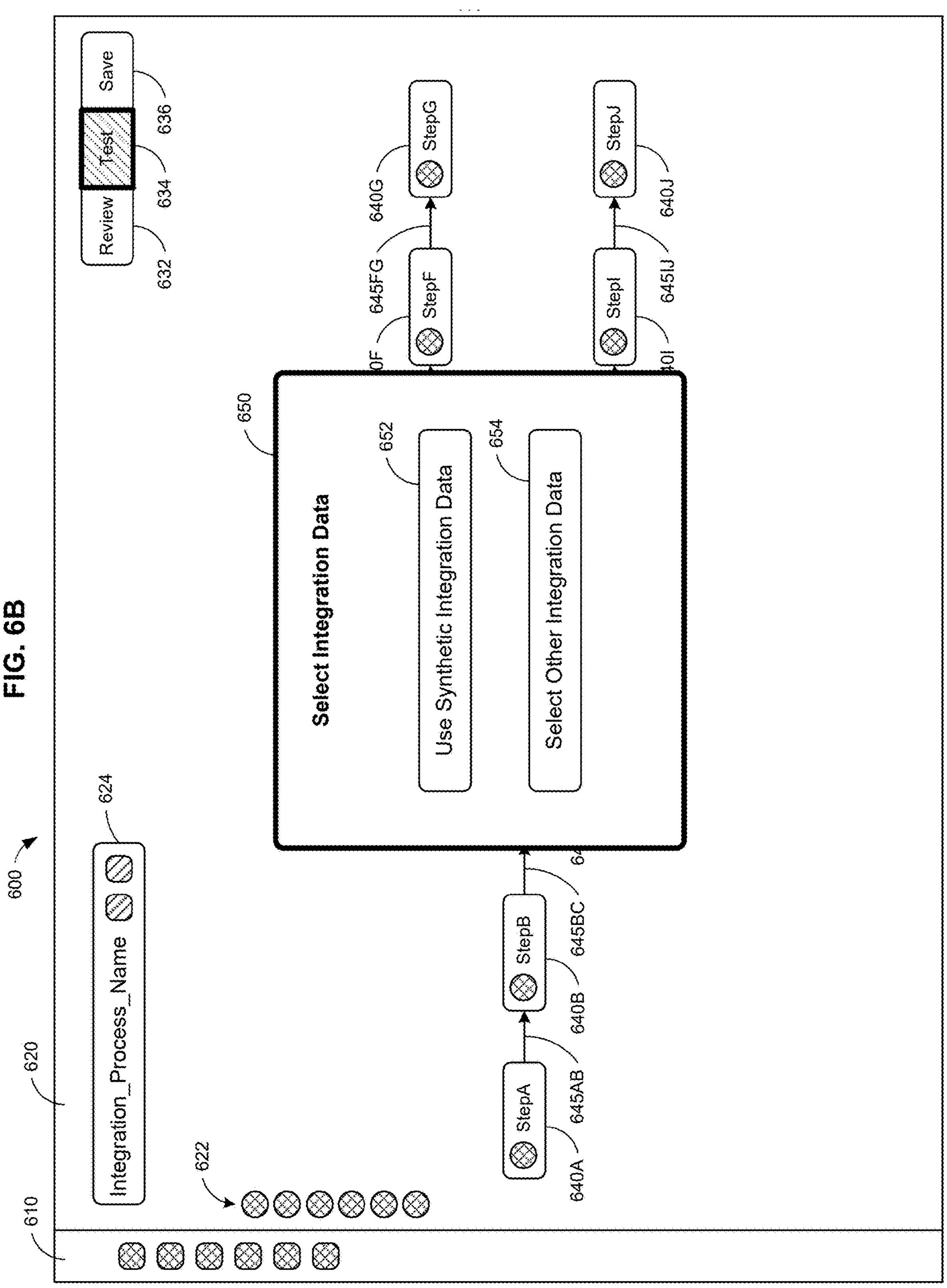

FIG. 6B illustrates graphical user interface 600 after a user has selected test input 634, according to an embodiment. In response to the selection of test input 634, a frame 650 may be overlaid over the current screen in graphical user interface 600. The frame may represent a wizard that comprises instructions, prompts, and/or inputs that guide the user through the configuration of integration testing of the integration process 160 currently represented in graphical user interface 600.

Of particular relevance to disclosed embodiments, the wizard may comprise instructing the user to select the integration data to be used to test integration process 160. This selection may be implemented by module 335. In this regard, frame 650 may comprise an input 652 for selecting synthetic integration data 330, which may have been previously generated by generative model 325 (e.g., in the background, in response to some past triggering event, etc.) or which may be generated in response to selection of input 652. Frame 650 may also comprise an input 654 for selecting alternative integration data 340. In response to the selection of input 654, the wizard may guide the user through the selection of alternative integration data 340 (e.g., via a file-system browser or otherwise selecting from a set of saved datasets, selecting a third-party system 170 from which alternative integration data 340 is to be retrieved, etc.). The selected integration data may be filtered according to one or more criteria, as discussed elsewhere herein, using subsequent screens (not shown) in the wizard. After the user has selected the integration data to be used for testing, and optionally after the completion of one or more other actions within the wizard, integration process 160 may be tested by module 345, as discussed with respect to subprocess 460.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

As used herein, the terms "comprising," "comprise," and "comprises" are open-ended. For instance, "A comprises B" means that A may include either: (i) only B; or (ii) B in combination with one or a plurality, and potentially any number, of other components. In contrast, the terms "consisting of," "consist of," and "consists of" are closed-ended. For instance, "A consists of B" means that A only includes B with no other component in the same context.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor to perform the method, the method comprising steps of:

storing crowd sourced integration configurations from a plurality of integration platforms managed on an Integration Platform as a Service (iPaaS) platform, wherein each of the crowd-sourced integration configurations is a configuration of an integration process on one of the plurality of integration platforms;

retrieving a relevant set of integration configurations from the crowd-sourced integration configurations based on a set of one or more cybersecurity threat endpoints and a configuration of a specific integration process to be tested;

applying a generative model to the relevant set of integration configurations, wherein the generative model outputs synthetic integration data to be input to the specific integration process;

testing the specific integration process by inputting the synthetic integration data to the specific integration process, while the specific integration process is executing within a test environment, to produce test results; and outputting the test results.

2. The method of claim 1, wherein the generative model is a generative language model.

3. The method of claim 2, wherein the generative language model is a large language model.

4. The method of claim 1, further comprising using the at least one hardware processor to receive a selection of the synthetic integration data from among the synthetic integration data and alternative integration data.

5. The method of claim 1, further comprising, prior to testing the specific integration process, filtering the synthetic integration data according to one or more criteria.

6. The method of claim 5, wherein the one or more criteria comprise a number of instances of synthetic integration data.

7. The method of claim 5, wherein the one or more criteria comprise at least one of the one or more cybersecurity threat endpoints.

8. The method of claim 1, wherein the test results comprise a list of cybersecurity threats to which the specific integration process is vulnerable.

9. The method of claim 1, further comprising using the at least one hardware processor to receive feedback regarding the test results.

10. The method of claim 9, further comprising using the at least one hardware processor to update the generative model based on the received feedback.

11. The method of claim 1, wherein the testing is performed during a design phase of the specific integration process, prior to deployment of the specific integration process to a production environment.

12. The method of claim 11, further comprising using the at least one hardware processor to, when the tests results comprise one or more of a set of cybersecurity threats, block the deployment of the specific integration process to the production environment.

13. The method of claim 12, wherein blocking of the deployment is maintained until the one or more cybersecurity threats in the set of cybersecurity threats are resolved or the blocking of the deployment is overridden by a user.

14. The method of claim 1, wherein retrieving the relevant set of integration configurations comprises retrieving, as the relevant set of integration configurations, one or more integration configurations in the crowd-sourced integration configurations that have an identical or similar configuration as the specific integration process and comprise at least one of the one or more cybersecurity threat endpoints.

15. The method of claim 1, further comprising using the at least one hardware processor to, prior to applying the generative model, train the generative model using a generative adversarial network that comprises the generative model and a discriminator, wherein the discriminator classifies real integration data and synthetic integration data, output by the generative model, into a real class or a fake class, and wherein the generative model and discriminator are updated based on respective losses.

16. A system comprising:

at least one hardware processor; and software that is configured to, when executed by the at least one hardware processor, stored crowd-sourced integration configurations from a plurality of integration platforms managed on an Integration Platform as a Service (iPaaS) platform, wherein each of the crowd-sourced integration configurations is a configuration of an integration process on one of the plurality of integration platforms, retrieve a relevant set of integration configurations from the crowd-sourced integration configurations based on a set of one or more cybersecurity threat endpoints and a configuration of a specific integration process to be tested, apply a generative model to the relevant set of integration configurations, wherein the generative model outputs synthetic integration data to be input to the specific integration process, test the specific integration process by inputting the synthetic integration data to the specific integration process, while the specific integration process is executing within a test environment, to produce test results, and output the test results.

17. A non-transitory computer-readable medium having instructions stored therein, wherein the instructions, when executed by a processor, cause the processor to:

stored crowd-sourced integration configurations from a plurality of integration platforms managed on an Integration Platform as a Service (iPaaS) platform, wherein each of the crowd-sourced integration configurations is a configuration of an integration process on one of the plurality of integration platforms;

retrieve a relevant set of integration configurations from the crowd-sourced integration configurations based on a set of one or more cybersecurity threat endpoints and a configuration of a specific integration process to be tested;

apply a generative model to the relevant set of integration configurations, wherein the generative model outputs synthetic integration data to be input to the specific integration process;

test the specific integration process by inputting the synthetic integration data to the specific integration process, while the specific integration process is executing within a test environment, to produce test results; and output the test results.

* * * * *